May 27, 1930.   F. W. WELK   1,759,970
HOG TONGS
Filed Nov. 5, 1928

INVENTOR.
Frederick William Welk
BY
James F. Splain
ATTORNEY.

Patented May 27, 1930

1,759,970

UNITED STATES PATENT OFFICE

FREDERICK WILLIAM WELK, OF MARKESAN, WISCONSIN

HOG TONGS

Application filed November 5, 1928. Serial No. 317,234.

The object of my said invention is the provision of a hog catcher and holder which while simple and inexpensive in construction is highly efficient and is well adapted to withstand the rough usage to which hog handling devices are ordinarily subjected.

To the attainment of the foregoing, the invention consists in the improvement as hereinafter described and definitely claimed.

In the accompanying drawings, forming part of this specification:

Similar numerals of reference designate corresponding parts in all of the views of the drawings.

Figure 3:
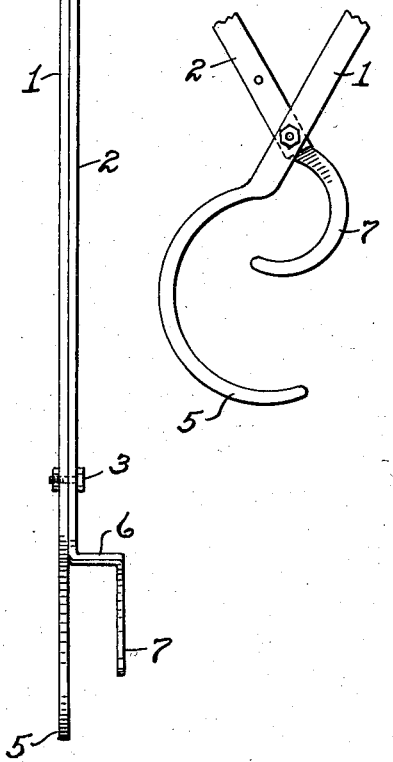
Figure 3 is a fragmentary side elevation with the jaws of the holder in open positions and differently arranged from Figure 1.

Among other elements my novel device comprises two long handle members 1 and 2, arranged close together in side by side parallelism, and pivotally connected together at 3 so that each member has a long rear arm and a short forward arm. I would also say that by preference the member 2 has a supplemental pivot-pintle receiving aperture 4, Figure 1, so that said member 2 may be shifted with respect to the point of pivot connection, Figure 3, as when it is desired by adjustment to adapt the device for catching and holding small hogs.

At its forward end the member 1 is merged into a curvilinear jaw 5.

Figure 2:
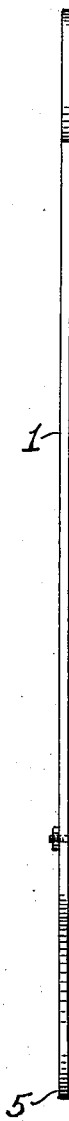
Figure 2 is an edge elevation of the same.

The member 2 at its forward end has a lateral offset 6, Figure 2, and at its outer end said offset 6 carries a comparatively short curvilinear jaw 7, reversely arranged in curvature to the jaw 5 and arranged in parallel spaced relation to said jaw 5.

For the sake of lightness and strength the device is made of steel, though obviously it may be made of any other material compatible with its purpose without affecting my invention.

Figure 1:
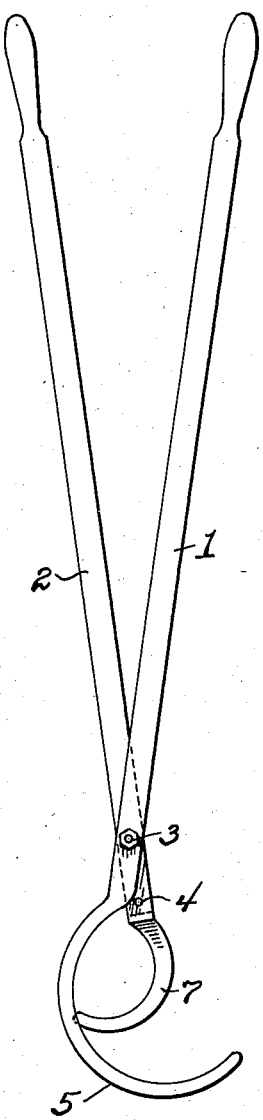
Figure 1 is a side elevation of the preferred embodiment of my invention.

In using the device, an operator with the device in hand approaches a hog from the rear and slips the jaws 5 and 7 over the hog's neck, whereupon the jaw 5 will rest under the hog's throat and when the handle members 1 and 2 are moved from the position shown in Figure 1 toward a closed position, the jaw 7 will press against the cords or muscles in the neck and cause the hog to remain quiet. The offsetting of the jaw 7 is materially advantageous because the point at which said jaw 7 presses against the neck of the hog is spaced from that where the jaw 5 rests under the neck and consequently the jaw 7 is more efficient in performing the function ascribed to it.

Practical use of the device as disclosed has demonstrated the fact that it is highly efficient in holding hogs incident to vaccination or ringing of the animals.

I have specifically described the preferred embodiment of the invention in order to impart an exact understanding of the same. I do not desire, however, to be understood as limiting myself to the precise construction shown and described, my invention being defined by my appended claim within the scope of which modifications may be made without departure from the principle of the invention.

Having described my invention, what I claim and desire to secure by Letters Patent, is:

A hog catcher and holder comprising handle members pivotally connected together and having long and short arms, the short arms of the members being equipped with reversely curved jaws one of which is smaller than the other, and one of the said short arms having at its forward end a laterally extending angular arm by the outer end of which the smaller jaw is carried whereby said small jaw is positioned in spaced parallel relation to the other jaw.

In testimony whereof I affix my signature.

FREDERICK WILLIAM WELK.